US011990612B2

(12) United States Patent
Adams et al.

(10) Patent No.: US 11,990,612 B2
(45) Date of Patent: May 21, 2024

(54) PROTECTED ZINC METAL ELECTRODES AND METHODS FOR RECHARGEABLE ZINC CELLS AND BATTERIES

(71) Applicant: Salient Energy Inc., Dartmouth (CA)

(72) Inventors: Brian D. Adams, Dartmouth (CA); Marine B. Cuisinier, Dartmouth (CA)

(73) Assignee: Salient Energy Inc., Dartmouth (CA)

( * ) Notice: Subject to any disclaimer, the term of this patent is extended or adjusted under 35 U.S.C. 154(b) by 608 days.

(21) Appl. No.: 17/268,312

(22) PCT Filed: Aug. 14, 2019

(86) PCT No.: PCT/CA2019/051110
§ 371 (c)(1),
(2) Date: Feb. 12, 2021

(87) PCT Pub. No.: WO2020/034035
PCT Pub. Date: Feb. 20, 2020

(65) Prior Publication Data
US 2021/0320295 A1 Oct. 14, 2021

Related U.S. Application Data

(60) Provisional application No. 62/718,712, filed on Aug. 14, 2018.

(51) Int. Cl.
*H01M 4/00* (2006.01)
*H01M 4/04* (2006.01)
(Continued)

(52) U.S. Cl.
CPC ......... *H01M 4/42* (2013.01); *H01M 4/0409* (2013.01); *H01M 4/0419* (2013.01);
(Continued)

(58) Field of Classification Search
CPC ...... H01M 10/36; H01M 4/244; H01M 10/44; H01M 4/0419; H01M 4/26; H01M 4/62; H01M 4/42; H01M 4/623
See application file for complete search history.

(56) References Cited

U.S. PATENT DOCUMENTS 5,728,489 A * 3/1998 Gao .................. H01M 10/0565
429/309
2015/0236322 A1 8/2015 Laramie et al.

FOREIGN PATENT DOCUMENTS

JP 3613400 B2 * 1/2005 ........ H01M 10/0436

OTHER PUBLICATIONS

Ogawa, Non-aqueous Secondary Battery And Manufacturing Method Thereof, Jan. 2005, See the Abstract. (Year: 2005).*

(Continued)

*Primary Examiner* — Chanceity N Robinson
*Assistant Examiner* — Monique M Wills
(74) *Attorney, Agent, or Firm* — Own Innovation; James W. Hinton; Kent C. Howe

(57) ABSTRACT

A protected zinc electrode, rechargeable cell, and methods of fabricating and operating the protected zinc electrode are provided. The protected zinc electrode includes a zinc electrode including an electrode active material including bulk zinc metal. The protected zinc electrode also includes a protective structure in physical continuity with the bulk zinc metal. The protective structure includes one or more layers. Each layer includes a solid-electrolyte component forming a continuous Zn2+ ion-conducting network throughout the layer.

20 Claims, 6 Drawing Sheets

(51) Int. Cl.
  *H01M 4/36* (2006.01)
  *H01M 4/42* (2006.01)
  *H01M 4/62* (2006.01)
  *H01M 10/36* (2010.01)
  *H01M 10/44* (2006.01)
  *H01M 4/02* (2006.01)

(52) U.S. Cl.
  CPC ........... *H01M 4/366* (2013.01); *H01M 4/623* (2013.01); *H01M 10/36* (2013.01); *H01M 10/44* (2013.01); *H01M 2004/027* (2013.01); *H01M 2300/0002* (2013.01)

(56) References Cited

OTHER PUBLICATIONS

European Patent Office, Extended European Search Report for EP Patent App. No. 19850212.2, dated Apr. 8, 2022.

CIPO as International Searching Authority, International Search Report and Written Opinion for PCT/CA2019/051110, dated Oct. 22, 2019.

Lei Fan et al., "Recent Progress of the Solid-State Electrolytes for High-Energy Metal-Based Batteries", Advanced Energy Materials, Apr. 16, 2018, vol. 8, issue 11, article 1702657 (First Published Jan. 26, 2018).

Mainar et al., "Enhancing the Cycle Life of a Zinc-Air Battery by Means of Electrolyte Additives and Zinc Surface Protection", Batteries, Sep. 13, 2018, 4(3).

Mingqiang et al., "Artificial Solid-Electrolyte Interface Facilitating Dendrite-Free Zinc Metal Anodes via Nanowetting Effect", ACS Applied Materials & Interfaces, Aug. 13, 2019, 11 (35).

Schmid et al.: "Zinc particles coated with bismuth oxide based glasses as anode material for zinc air batteries with improved electrical rechargeability", Electrochimica Acta, vol. 260, Jan. 10, 2018, pp. 246-253.

Yao et al., "Review on Polymer-Based Composite Electrolytes for Lithium Batteries", Frontiers in Chemistry, vol. 7, Aug. 2019, Article 522.

Zhu et al., "Effects of ionomer films on secondary alkaline zinc electrodes", Journal of Power Sources, vol. 73, Issue 2, 1998, pp. 266-270.

* cited by examiner

PROTECTED ZINC METAL ELECTRODES AND METHODS FOR RECHARGEABLE ZINC CELLS AND BATTERIES

TECHNICAL FIELD

The following relates generally to secondary electrochemical cells, and more particularly to secondary electrochemical cells (hereafter, cells) that use metallic zinc as the negative electrode.

INTRODUCTION

The following paragraphs are not an admission that anything discussed in them is prior art or part of the knowledge of persons skilled in the art.

Primary and secondary electrochemical cells employing zinc metal have been used in commercial applications for well over a century. Zinc is inexpensive, non-toxic, is stable in water due to a high overpotential for hydrogen evolution, and has a low redox potential (−0.76 V vs. standard hydrogen electrode (SHE)) compared to other negative electrode materials used in aqueous batteries.

The most common of these cells have been primary (i.e. non-rechargeable) cells that use an alkaline electrolyte and a metal oxide positive electrode material that reacts with hydroxide ions in the electrolyte. To allow for this type of reaction, the battery must employ a very alkaline electrolyte. However, the use of an alkaline electrolyte inhibits the cell's ability to be recharged. Therefore, developing a zinc-based battery that operates in a neutral or acidic pH electrolyte is of significant interest because it will allow for rechargeability. Modern examples of rechargeable zinc cells operating with electrolytes having pH<7 include zinc-air, zinc-ion, zinc-bromide, zinc-iodide, zinc-iron and zinc-cesium.

One drawback and challenge for secondary batteries using zinc metal negative electrodes is the formation of dendritic or mossy deposits which can build up during repeated cycling and cause premature cell failure by internal short circuits. Additionally, if the Coulombic efficiency for stripping/plating zinc is less than 100%, an excess of zinc metal is required to sustain an appropriate number of cycles of the battery. Side reactions consuming electrons can be linked to other problems, such as gassing ($H_2$ evolution) and/or electrolyte drying out (consumption of $H_2O$). These challenges are a result of zinc metal)($Zn^0$) reactivity at the interface with the electrolyte.

Traditionally, battery manufacturers have relied on a thick microporous separator between the negative and the positive electrodes to circumvent the formation of dendrites and delay the occurrence of short-circuits. This strategy, however, does not improve the stripping/plating morphology of zinc, nor does it mitigate the Coulombic inefficiency of these processes.

Other methods that have been employed to inhibit the formation of dendrites can be categorized as: (i) either mixing and die-pressing or alloying zinc with other metals such as magnesium; (ii) using a skeletal frame and/or controlling the porosity distribution within the powdered zinc electrode; or (iii) using an electrolyte solution comprising salts in extremely high concentration.

These methods do offer protection against uncontrolled deposition of zinc metal; however, they each significantly decrease the specific (gravimetric) and volumetric energy density of the cell by, respectively: (i) increasing the weight and volume of inactive components; (ii) increasing the amount of void space; and (iii) increasing the weight of the electrolyte.

SUMMARY

The following is intended to introduce the reader to the detailed description that follows and not to define or limit the claimed subject matter.

In an aspect, a protected zinc electrode is provided. The protected zinc electrode includes a zinc electrode and a protective structure. The zinc electrode includes an electrode active material comprising bulk zinc metal. The protective structure is in physical continuity with the bulk zinc metal. The protective structure includes one or more layers. Each layer includes a solid-electrolyte component forming a continuous Zn2+ ion-conducting network throughout the layer.

Each layer of the protective structure may include a filler component which closes off through-pores in the layer.

The protective structure may have a first surface in contact with the electrode active material and a second surface for contacting an aqueous electrolyte when the protected zinc electrode is incorporated into an electrochemical cell.

The electrode active material may include zinc metal.

The electrode active material may include a zinc alloy.

The protected zinc electrode may include a current collector including an active surface, the active surface comprising a layer of zinc.

The protective structure may be chemically inert to an electrolyte to be used within an electrochemical cell.

The electrolyte may include at least one salt dissolved in at least one solvent, and the electrolyte may have a pH less than 7.

The protected zinc electrode may be a negative electrode in an electrochemical cell.

The solid electrolyte component may include at least one of a polymer, a glass, and a ceramic.

The solid electrolyte component may transport Zn2+ in the solid state.

The solid electrolyte component may be contained within the protective structure.

The solid electrolyte component may include a compound that can intercalate divalent cations.

The solid electrolyte component may include a clay material.

The solid electrolyte component may include montmorillonite.

The solid electrolyte component may include vermiculite.

The solid electrolyte component may have a cation exchange capacity greater than 10× cmolc/kg when the solid electrolyte component is hydrated with H2O in an interlamellar space.

The solid electrolyte component may include a zeolite.

The zeolite may be a natural zeolite.

The zeolite may be a synthetic zeolite.

The solid electrolyte component may have a shear modulus between 10 GPa and 50 GPa.

The filler component may provide no ionic pathways within the protective structure.

The filler component may include at least one of a polymer, a glass, and a ceramic.

The filler component may include an organic polymer.

The filler component may include a polymer, and the polymer may be selected from a group consisting of polypropylene, polyethylene, polytetrafluoroethylene, polyvinylidene fluoride, polystyrene, polyvinyl chloride, polyimide, polyimide, polyester, polyacrylonitrile, polyethylene teraphalate, polyethylene oxide, polyvinyl butyral, styrene butadiene rubber, polysaccharide, polypeptide, polyvinyl alcohol, polyacrylic acid, polyurethane, acrylonitrile butadiene styrene, polyvinylpyrrolidone, polyvinyl acetate, polymethyl methacrylate, cis-polyisoprene, polychloroprene, polycarbonate, polyvinyl siloxane, perfluorosulfonic acid, polypyrrole, polyethylene glycol, polyaniline, polythiophene, and polybutyl acrylate.

The filler component may include a glass, and the glass may include any one or more of a silicate, an alumina, a nitride, a carbide, a boride, a titanate, a zirconia, a carbonate, a sulfide, a halide, an oxide, a sulfate, a phosphate.

The filler component may include a ceramic, and the ceramic may include any one or more of a silicate, an alumina, a nitride, a carbide, a boride, a titanate, a zirconia, a carbonate, a sulfide, a halide, an oxide, a sulfate, a phosphate.

The filler component may include a cation exchange polymer.

The cation exchange polymer may be used as a single-component protective layer.

The cation exchange polymer may be perfluorosulfonic acid or perfluorocarboxylic acid.

The cation exchange polymer may be a polymer gel electrolyte.

The polymer gel electrolyte may include a polymer matrix swollen with a zinc salt solution.

The filler component may have a shear modulus between 1 GPa and 10 GPa.

The protective structure may have a thickness greater than the average roughness of the zinc electrode.

The protective structure may have an ionic conductivity of at least $10^{-7}$ S/cm.

The protective structure may have an ionic conductivity between $10^{-7}$ S/cm and $10^{-3}$ S/cm.

The protective structure may have an ionic conductivity between $10^{-7}$ S/cm and $10^{-4}$ S/cm.

The protective structure may have an ionic conductivity between $10^{-6}$ S/cm and $10^{-5}$ S/cm.

The protective structure may have a thickness between 0.1 microns and 1000 microns.

The protective structure may have an ionic conductivity between $1\times10^{-7}$ S/cm and $1\times10^{-6}$ S/cm and a thickness between 0.25 micron and 1 micron.

The protective structure may have an ionic conductivity between $10^{-4}$ S/cm and $10^{-3}$ S/cm and a thickness between 10 microns and 500 microns.

The protective structure may have an ionic conductivity between $10^{-4}$ S/cm and $10^{-3}$ S/cm and a thickness between 10 microns and 100 microns.

The protective structure may have an ionic conductivity between $10^{-4}$ S/cm and $10^{-3}$ S/cm and a thickness between 15 microns and 25 microns.

The protective structure may have a shear modulus greater than the shear modulus of zinc metal.

The protective structure may include a first surface and a second surface, wherein the first surface forms a first interface with the zinc electrode, and wherein the second surface is capable of forming a second interface with an aqueous electrolyte in an electrochemical cell.

$Zn^{2+}$ ions may be desolvated at the first interface.

$Zn^{2+}$ ions may be reduced and deposit onto the zinc electrode as zinc metal)($Zn^0$).

$Zn^{2+}$ ions may diffuse through the protective structure towards the first interface at which the $Zn^{2+}$ can be solvated by a solvent of the aqueous electrolyte.

The protective structure may form an impervious barrier to an aqueous electrolyte when arranged in an electrochemical cell.

The protective structure may have an ionic conductivity greater than $10^{-8}$ S/cm and be electrically insulating.

In another aspect, a method of fabricating a protected zinc electrode is provided. The method includes providing a zinc electrode including an electrode active material comprising bulk zinc. The method also includes providing a protective structure formulation, the protective structure formulation including a solid electrolyte component. The method also includes applying a layer of the protective structure formulation onto the zinc electrode.

The method may include performing a curing, drying, or treatment step after applying the layer of the protective structure formulation and applying a second layer of the protective structure material, wherein the performing step is performed prior to the applying step.

The method may include mixing a plurality of components to form the protective structure formulation, the plurality of components including the solid electrolyte component and a filler component.

The applying the layer of the protective structure may be performed using tape casting, slot die coating, reverse roll coating, or spray-painting.

The layer of the protective structure formulation may be applied as a slurry, paste, or ink to the surface of the negative electrode.

In another aspect, a method of operating a protected zinc electrode in a rechargeable battery, the rechargeable battery including an electrochemical cell, is provided. The method includes providing a protected zinc negative electrode comprising a zinc negative electrode and a protective structure in physical continuity with the zinc negative electrode. The method also includes providing an electrolyte comprising at least one salt dissolved in at least one solvent, the electrolyte having a pH less than 7. The method also includes providing a positive electrode comprising one of a zinc-ion insertion material, a bromide redox active catholyte, an iodide redox active catholyte, an iron redox active catholyte, a cesium redox active catholyte, or a catalyst for reaction with oxygen. The method also includes, alternatively, applying either a current or a potential between the protected zinc negative electrode and the positive electrode to charge the electrochemical cell, and draining an electrical load between the protected zinc negative electrode and the positive electrode to discharge the electrochemical cell.

In another aspect, an electrochemical cell for use in a rechargeable battery is provided. The electrochemical cell includes a protected negative electrode, a positive electrode, and an aqueous electrolyte separating the protected negative electrode and the positive electrode. The protected negative electrode includes a zinc negative electrode including active material comprising bulk zinc metal. The protected negative electrode also includes a protective structure in physical continuity with the bulk zinc metal. The protective structure includes one or more layers. Each layer includes at least a solid-electrolyte component forming a continuous Zn2+ ion-conducting network throughout the layer The electrolyte may include at least one salt dissolved in at least one solvent, and the electrolyte may have a pH less than 7.

The protective structure may have a first surface in contact with the negative electrode active material and a second surface in contact with the aqueous electrolyte.

In an embodiment, a rechargeable battery is provided that includes the electrochemical cell.

The protective structure may include a first surface and a second surface, wherein the first surface forms a first interface with the zinc electrode, and wherein the second surface forms a second interface with the aqueous electrolyte.

$Zn^{2+}$ ions may be desolvated at the first interface.

$Zn^{2+}$ ions may be reduced at the second interface and deposit onto the zinc electrode as zinc metal)($Zn^0$).

Zn2+ ions may diffuse through the protective structure towards the first interface where the $Zn^{2+}$ may be solvated by a solvent of the aqueous electrolyte.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

As used herein, the term "between", when used in reference to a range of values such as an ionic conductivity range, means the range inclusive of the lower limit value and upper limit value, unless otherwise stated.

The present disclosure provides an apparatus for use in a rechargeable battery. The apparatus includes a protected zinc negative electrode and an electrolyte for transferring ions between the negative electrode and a positive electrode. The protected zinc negative electrode includes zinc metal. The protected zinc negative electrode includes a protective structure. The protective structure is in physical continuity with the zinc metal.

The negative electrode includes a negative electrode active material. The negative electrode active material may be formed substantially of zinc metal. The negative electrode active material may be formed substantially of a zinc alloy.

The negative electrode may include a current collector. The current collector includes an active surface. The active surface may be formed substantially of a layer of zinc.

In an embodiment, the protected zinc negative electrode includes a protective structure including at least one solid-electrolyte component. The solid-electrolyte component forms a continuous Zn2+ ion-conducting network throughout the protective structure. The protective structure may include one or more filler components. The filler component may reduce through-pores in the protective structure.

Figure 2B:
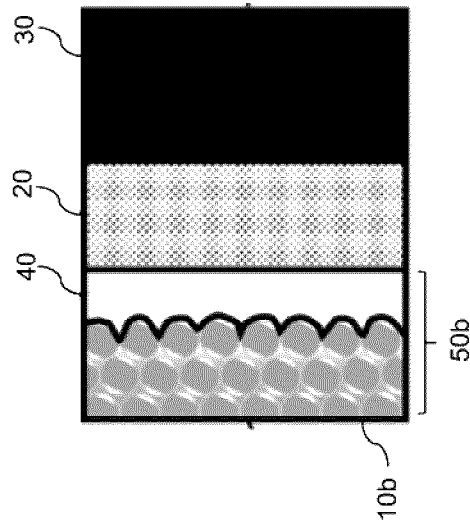
FIG. 2B is a two-dimensional representation of a rechargeable cell including a protected zinc electrode, according to another embodiment.
Figure 2A:
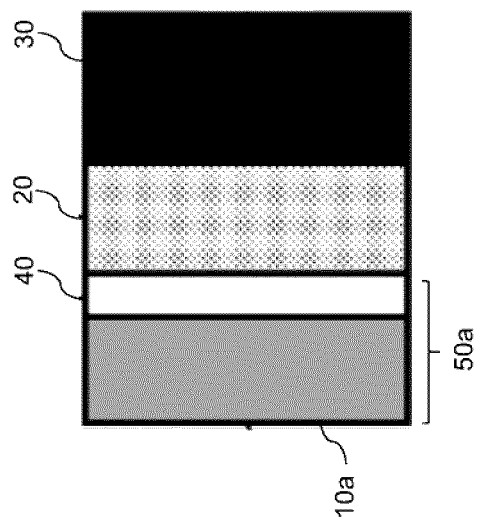
FIG. 2A is a two-dimensional representation of a rechargeable cell including a protected zinc electrode, according to an embodiment.

The present disclosure also provides a method of fabricating a protected zinc negative electrode (e.g. protected zinc electrode 50 of FIG. 2A, 2B). The method includes: designing a protective structure 40 having a single-layer or multi-layer configuration, selecting components of each layer of the protected zinc electrode 50, which components include at least one solid-electrolyte component 411 capable of forming a continuous $Zn^{2+}$ ion-conducting network throughout the layer; for each layer in the protected structure 40, mixing the selected components including the at least one solid-electrolyte component 411; applying a first layer of the protective structure 40 onto the negative electrode 10. The method may further include, after applying the first layer, performing a curing, drying, or treatment step prior to the deposition of a second layer. The method includes the curing, drying, and treatments steps to prepare a deposited layer for the deposition of another layer on top of the deposited layer.

The present disclosure also provides a method of operating a protected zinc electrode (e.g. protected zinc electrode 50 of FIGS. 2A, 2B) in a rechargeable battery. The method includes: providing a protected negative electrode comprising zinc and including a protective structure; providing an electrolyte comprising at least one salt dissolved in at least one solvent, the electrolyte having a pH<7; and, providing a positive electrode comprising either a zinc-ion insertion material; a bromide, iodide, iron or cesium redox active catholyte; or a catalyst material for a zinc-air reaction (i.e. a catalyst for reaction with oxygen).

The present disclosure relates generally to secondary electrochemical cells, and more particularly to improving performance of secondary electrochemical cells using zinc metal as the negative electrode in a neutral or acidic electrolyte.

Figure 1B:
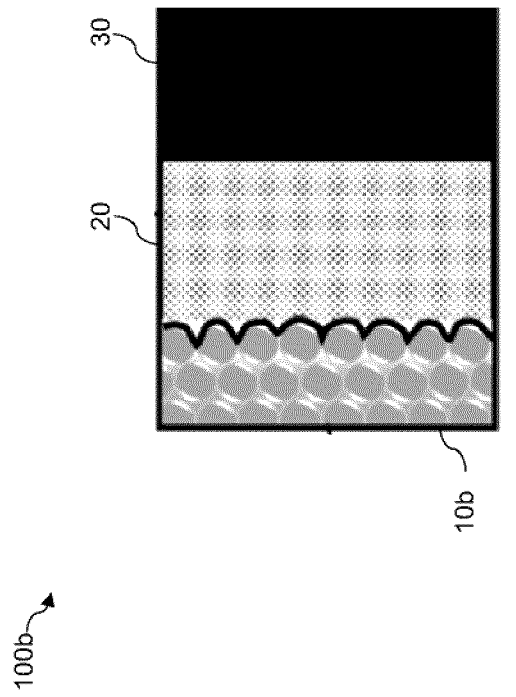
FIG. 1B is a two-dimensional representation of a rechargeable cell having a negative electrode including powdered zinc, according to existing methods.
Figure 1A:
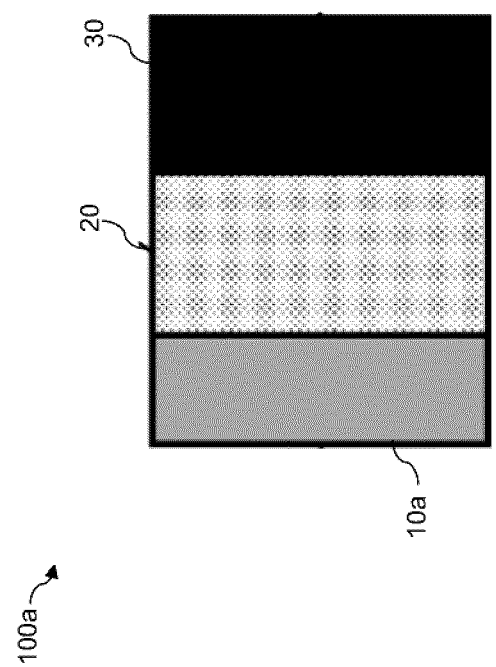
FIG. 1A is a two-dimensional representation of a rechargeable cell having a negative electrode formed substantially of zinc metal, according to existing methods.

Referring now to FIGS. 1A and 1B, shown therein are two-dimensional representations of embodiments of electrochemical cells 100a and 100b. The electrochemical cells 100a, 100b represent rechargeable electrochemical cells as may be currently used in the art.

The cells 100a, 100b each include a zinc metal negative electrode (electrodes 10a, 10b respectively). Throughout the present disclosure, negative electrodes 10a and 10b are referred to collectively as negative electrodes 10 and generically as negative electrode 10. Similarly, cells 100a and 100b are referred to throughout the present disclosure collectively as cells 100 and generically as cell 100.

The negative electrode 10 includes an active zinc metal. The negative electrode 10 may be formed substantially of zinc metal. The negative electrode 10 may be a zinc foil. The negative electrode 10 may include a powdered zinc electrode deposited on a current collector.

The negative electrode 10 may include a current collector. The current collector may include an active surface comprising a layer of zinc.

Cell 100a includes negative electrode 10a. The negative electrode 10a is formed substantially of zinc metal. The negative electrode 10a may be a zinc foil.

Cell 100b includes negative electrode 10b. The negative electrode 10b is a powdered zinc electrode deposited on a current collector.

The layer of zinc may include a sheet of zinc metal (for example, negative electrode 10a). The layer of zinc may include powdered and/or flaked zinc metal (for example, negative electrode 10b).

The zinc metal may be pure zinc. The zinc metal may be a zinc alloy. The zinc alloy may be bismuth—indium—calcium, bismuth—aluminum, bismuth—indium, bismuth—indium—aluminum, or the like.

The current collector may be formed substantially of a material including any one or more of carbon, boron, lead, vanadium, chromium, manganese, molybdenum, tungsten, iron, cobalt, nickel, cadmium, tungsten, bismuth, tin, indium, antimony, copper, titanium, aluminum, magnesium, zinc metal, and any combination thereof.

The cells 100a, 100b also each include a positive electrode 30 and an electrolyte 20. The negative electrode 10 is separated from the positive electrode 30 by the electrolyte 20.

While the components of cells 100a, 100b are depicted as being disposed directly on one another, it should be understood that other components may also be present. For example, the electrolyte 20 may be absorbed within a separator layer that is not depicted in cells 100a, 100b. Current collectors are also not depicted in cells 100a, 100b and may be present.

Although the morphology and microstructure of the zinc metal electrode 10 can vary significantly, for example between a pure sheet of zinc metal (as in negative electrode 10a) and a porous composite zinc electrode (as in negative electrode 10b), the present disclosure can apply to any and all electrodes comprising zinc metal.

Referring now to FIGS. 2A and 2B, shown therein are two-dimensional representations of rechargeable cells 200a and 200b having protected zinc electrodes, according to embodiments. Throughout the present disclosure, cells 200a and 200b are referred to throughout the present disclosure collectively as cells 200 and generically as cell 200.

Cells 200a and 200b represent embodiments incorporating aspects of the present disclosure that may provide various improvements and advantages over the cells 100a, 100b of FIGS. 1A and 1B above.

Cells 200a, 200b include a protected zinc electrode (protected zinc electrode 50a and 50b, respectively). Throughout the present disclosure, protected zinc electrodes 50a and 50b are referred to collectively as protected zinc electrode 50 and generically as protected zinc electrode 50.

The protected zinc electrode 50 includes the zinc electrode 10 (electrode 10a in cell 200a and electrode 10b in cell 200b) and a protective structure 40.

In an embodiment, the protective structure 40 is an ionically conductive protective structure in physical continuity with an active zinc metal. The active zinc metal may include a sheet of zinc (e.g. negative electrode 10a of FIG. 2A), zinc alloy, or powdered and/or flaked zinc (e.g. negative electrode 10b of FIG. 2B).

The protective structure 40 is in physical continuity with bulk zinc material (i.e. of the zinc electrode 10). The zinc electrode 10 includes an electrode active material including the bulk zinc material.

The protective structure is applied to the zinc negative electrode 10. The protective structure 40 may be applied to a zinc foil, as in zinc electrode 10a of cell 200a.

The protective structure 40 may be applied to a powdered zinc electrode deposited on a current collector, as in zinc electrode 10b of cell 200b.

The cells 200a, 200b also each include a positive electrode 30 and an electrolyte 20. The positive electrode 30 is separated from the protected zinc negative electrode 50 by the electrolyte 20.

Cells 200a, 200b each comprise a zinc metal negative electrode (10a, 10b, respectively), an electrolyte 20, and a positive electrode 30. The zinc metal negative electrode 10 is separated from the electrolyte 20 and the positive electrode 30 by the protective structure 40.

The electrolyte 20 may include at least one salt dissolved in at least one solvent. The electrolyte 20 may have a pH<7.

The positive electrode 30 may include any electrochemically active material, including a zinc-ion insertion material, a catalyst for reactions with air, or a bromide, iodide, iron or cesium redox active catholyte.

The protective structure 40 may be applied onto the active zinc metal electrode 10. The application of the protective structure 40 onto the active zinc metal electrode 10 (whether a pure sheet of zinc metal as in electrode 10a or particulate and/or alloyed zinc as in electrode 10b) results in the protected zinc electrodes 50a, 50b.

The protective structure 40 may be a dense protective structure. The protective structure 40 may selectively allow $Zn^{2+}$ to pass through (i.e. ionically conductive). By applying a dense protective structure 40 to the zinc metal electrode 10 that selectively allows $Zn^{2+}$ to pass through (ionically conductive), the deposition (plating) and dissolution (stripping) of zinc metal in the zinc metal electrode 10 can be controlled.

The protective structure 40 may have a high ionic conductivity yet negligible electronic conductivity. This may ensure zinc metal does not deposit on a surface of the protective structure 40 exposed to the electrolyte 20.

The protective structure 40 may provide a barrier that is resistant to puncture from metallic zinc and chemically inert with respect to the electrolyte. The protective structure 40 may be able to withstand large volume changes without fracturing such that zinc may deposit within the protected electrode 50 inwards and uniformly, rather than outwards and dendritically.

The protective structure 40 may be chemically inert to the electrolyte 20.

The protective structure 40 of the present disclosure may physically constrain growth of active zinc metal within the protected zinc negative electrode 50, which may prevent the active zinc metal from expanding outwards in a dendritic fashion. This effect may result from a combination of the ionic conductive and mechanical properties of the protective structure 40.

The protective structure 40 may provide various beneficial and advantageous effects. The protective structure 40 may promote the formation of a dense zinc deposit. The protective structure 40 may promote a more uniform current distribution throughout the negative electrode 10. The protective structure 40 may improve wettability of the zinc electrode 10. The protective structure 40 may improve availability of zinc metal within the protected electrode 50.

The protective structure 40 may also help prevent deleterious reactions with the electrolyte 20, such as hydrogen evolution.

The protective structure 40 may be a single-layer protective structure. The protective structure 40 may be a multilayer protective structure having a plurality of layers.

The protected zinc electrode 50, and in particular the protective structure 40, may impede outward growth of zinc dendrites. By impeding the outward growth of zinc dendrites, the original microstructure of the protected zinc electrode 50 can be preserved, and high density of the zinc deposit maintained. This, in turn, may increase zinc stripping/plating efficiency and prolong cycle-life. Additionally, in embodiments wherein the protective structure 40 is completely impermeable, the protective structure 40 may isolate the active zinc metal from its surrounding environment (e.g. an aqueous electrolyte 20), thereby preventing or reducing deleterious reactions such as hydrogen evolution or zinc dissolution.

Figure 3:
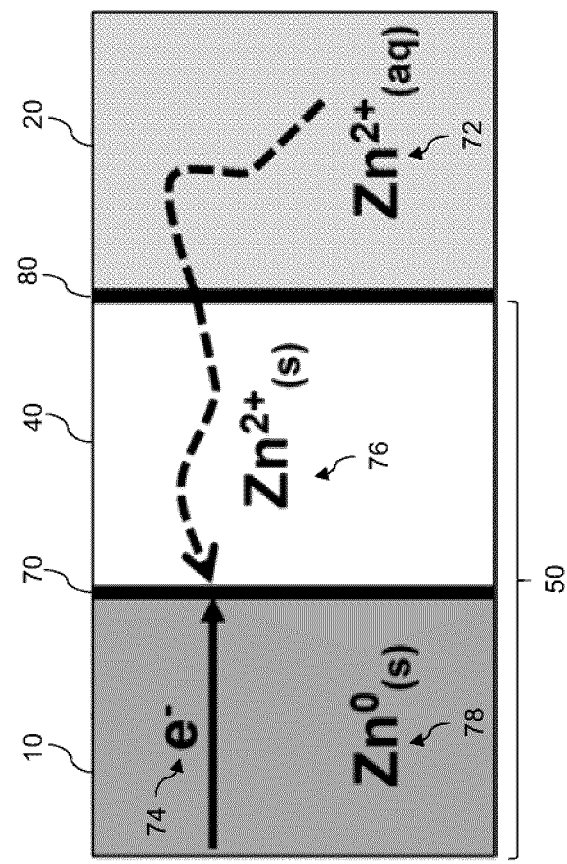
FIG. 3 is a two-dimensional representation of interfaces between a negative electrode, a protective structure, and an electrolyte in the rechargeable cell of FIG. 2A during charge of the cell, according to an embodiment.

Referring now to FIG. 3, shown therein is a two-dimensional representation illustrating functioning 300 of the protected zinc electrode 50a of cell 200a of FIG. 2A during deposition (plating) of zinc metal, according to an embodiment. In another embodiment, the protected zinc electrode may be protected zinc electrode 50b of cell 200b of FIG. 2B. FIG. 3 also illustrates interfaces between the negative electrode 10, the protective structure 40, and the electrolyte 20 of the cell 200a of FIG. 2A during charge of the cell 200a.

$Zn^{2+}$ ions 72 present in the electrolyte 20 can be desolvated at a first interface 80 between the electrolyte 20 and the protective structure 40 and diffuse through the protective structure 40.

At a second interface 70 between the protective structure 40 and the negative electrode 10, $Zn^{2+}$ ions 76 are reduced and deposit (plate) onto the negative electrode 10 as zinc metal)($Zn^0$) 78.

The protective structure 40 has high ionic conductivity, yet negligible electronic conductivity and is electrically insulating inhibiting zinc metal from depositing on the surface of the protective structure 40 that is exposed to the electrolyte 20.

During the dissolution (stripping) of zinc metal, zinc metal)($Zn^0$) present in the negative electrode 10 is oxidized as $Zn^{2+}$ ions. The $Zn^{2+}$ ions diffuse through the protective structure 40 towards the interface 80 between the protective structure 40 and the electrolyte 20, where the $Zn^{2+}$ ions are solvated by the electrolyte 20 solvent(s).

$Zn^{2+}$ ions migrate through the electrolyte 20 as solvates and through the rigid protective structure 40. Electrons 74 supplied from the external circuit are conducted through the negative electrode 10 up to the interface 70 with the electronically insulating protective structure 40, where the electrons 74 reduce $Zn^{2+}$ cations 76 into zinc metal $Zn^{(0)}$ 78.

The protective structure 40 may include of one or more layers. Each layer of the protective structure 40 may include one or more components.

The components include one or more solid-electrolyte components. The solid electrolyte component can transport $Zn^{2+}$ ions in the solid state. The solid-electrolyte component may include a polymer, a glass, and/or a ceramic. The solid-electrolyte component is capable of forming a continuous $Zn^{2+}$ ion-conducting network throughout the layer.

The components may include a filler component. Each layer of the protective structure 40 may include one or more filler components. The filler components may improve the mechanical properties of the layer. The filler components may improve the chemical stability of the layer. The filler components may decrease or reduce the porosity of the layer. The filler component may close off through-pores in the layer. The filler component may eliminate or significantly diminish through-porosity.

The solid electrolyte component is contained within the protective structure 40 separating the zinc metal of the zinc electrode 10 and the electrolyte 20.

The solid electrolyte component may be a matrix that provides a continuous conductive pathway for $Zn^{2+}$ ions, such that the composite protective structure 40 retains high Zn ion conductivity even if the filler component is not an ionic conductor.

Enhanced cycling performance may be achieved by maximizing the amount of the ionically conductive solid electrolyte component in the protective structure 40, as opposed to other components like filler particles or adhesives.

The solid-electrolyte component may be a compound that can intercalate divalent cations such as zinc.

The solid electrolyte component may have a cation exchange capacity greater than 10× cmolc/kg when the solid electrolyte is hydrated with $H_2O$ in the interlamellar space (e.g. when the electrode includes a layered electrode material (i.e. is a layered electrode) including a plurality of interlamellar spaces).

The solid-electrolyte component may be a clay material. The clay material may be montmorillonite, vermiculite, or the like. Many clay materials such as montmorillonite and vermiculite have high cation exchange capacity when they are hydrated with water in the interlamellar space.

The solid-electrolyte component may be a natural or synthetic zeolite. Natural and synthetic zeolites may accommodate a wide variety of cations that can readily be exchanged for $Zn^{2+}$ in a contact solution and/or during the functioning of a Zn-based battery.

In an embodiment, a continuous $Zn^{2+}$ ion-conducting network is formed so that ion migration can occur through the solid electrolyte component matrix.

The filler component may eliminate or reduce through-porosity by closing off through-pores in the solid electrolyte component, such as in between individual particles.

Closing of the porosity provides a physical barrier against dendritic growth, so that the density of the zinc deposit remains high upon repeated plating/stripping cycles. Closing of the porosity reduces the amount of electrolyte 20 that is in contact with metallic zinc, thereby preventing any deleterious reactions between zinc and the electrolyte 20.

The filler component should be chosen such that the filler component adheres well to the solid-electrolyte component.

In the case of a first layer of the protective structure 40 in direct contact with active zinc metal of the zinc electrode 10, the filler component may also fill the porosity and roughness of the zinc metal layer.

Figure 4:
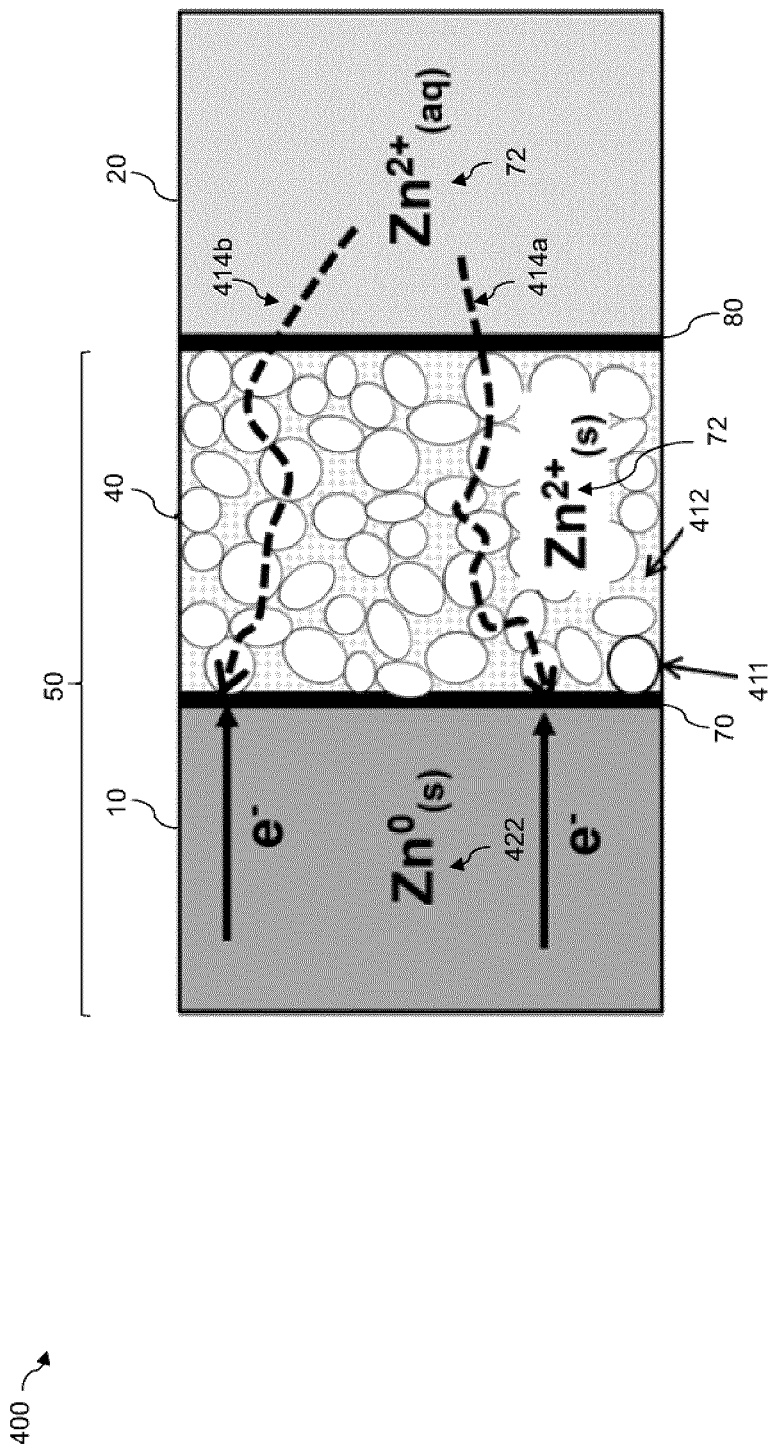
FIG. 4 is a two-dimensional representation of interfaces between a negative electrode, a protective structure, and an electrolyte of a rechargeable cell during charge of the cell, according to an embodiment.

Referring now to FIG. 4, shown therein is a two-dimensional representation of a protected zinc electrode 400 during deposition (plating) of zinc metal, according to an embodiment.

The protected zinc electrode 400 includes zinc electrode 10 and a protective structure 40. The electrode 400 includes negative electrode 10, electrolyte 20, and the protective structure 40.

FIG. 4 also illustrates interfaces between the negative electrode 10, protective structure 40, and the electrolyte 20, during the charge of the cell.

The protective structure 40 includes a solid electrolyte component. The solid electrolyte component includes a plurality of solid electrolyte particles 411. The solid electrolyte component is shown as round with particles. The solid electrolyte component 411 forms a continuous network. $Zn^{2+}$ ions migrate through the protective structure 40 by hopping within the continuous network formed by the solid electrolyte component 411.

The protective structure 40 also includes filler components 412. The filler components 412 form a filler matrix. The filler matrix serves a structural role. The filler components 412 provide no ionic conduction pathways.

$Zn^{2+}$ ions 420 present in the electrolyte 20 can be desolvated at a first interface 80 between the electrolyte 20 and the protective structure 40 and diffuse through the protective structure 40 within the continuous network formed by the solid-electrolyte particles 411. Such diffusion is depicted by arrows 414a, 414b.

At a second interface 70 between the solid electrolyte component 411 and the negative electrode 10, $Zn^{2+}$ ions are reduced and deposit (plate) onto the negative electrode 10 as zinc metal)($Zn^0$) 422.

Because the solid-electrolyte component 411 forms a continuous Zn-ion conductive network, it is not necessary for the filler component 412 to be Zn-ion conductive to achieve a composite protective structure 40 having high Zn-ion conductivity.

The filler component 412 may include any suitable material such as polymers, ceramics, and glasses. In an embodiment, at least one of the filler components 412 includes an organic polymer. The organic polymer may provide good surface adhesion. The organic polymer may also be easily and durably applied onto the active zinc metal.

A polymer component may include any one or more of polypropylene, polyethylene, polytetrafluoroethylene, polyvinylidene fluoride, polystyrene, polyvinyl chloride, polyamide, polyimide, polyester, polyacrylonitrile, polyethylene teraphalate, polyethylene oxide, polyvinyl butyral, styrene butadiene rubber, polysaccharide, polypeptide, polyvinyl alcohol, polyacrylic acid, polyurethane, acrylonitrile butadiene styrene, polyvinylpyrrolidone, polyvinyl acetate, polymethyl methacrylate, cis-polyisoprene, polychloroprene, polycarbonate, polyvinyl siloxane, perfluorosulfonic acid, polypyrrole, polyethylene glycol, polyaniline, polythiophene, polybutyl acrylate, and any combination thereof. A glass or ceramic component can include silicates, alumina, nitrides, carbides, borides, titanates, zirconia, carbonates, sulfides, halides, oxides, sulfates, phosphates, or the like, or any combination thereof.

In an embodiment, the protective structure 40 includes a cation exchange polymer. The combined ionic conductivity and mechanical properties (e.g. flexibility, elasticity, mechanical strength) of the cation exchange polymer may allow the cation exchange polymer to be used as a single-component protective layer. The cation exchange polymer may be perfluorosulfonic acid or perfluorocarboxylic acid (see Example 1, below). The cation exchange polymer may be a polymer gel electrolyte (PGE). The polymer gel electrolyte may include a polymer matrix swollen with a zinc salt solution.

In another embodiment, the cation-exchange polymer is used as a filler component 412 in addition to a ceramic solid-electrolyte (e.g. solid-electrolyte 411). The foregoing combination may provide increased mechanical strength against dendritic growth of zinc during the operation of a battery in which the electrode 400 is used (see Examples 2 and 3, below).

To provide sufficient integrity to the protected zinc electrode 50, 400, the protective structure 40 may have a thickness that is greater than the average roughness of the underlying zinc metal electrode 10 described above. This may be particularly important in embodiments using composite electrodes made of powdered and/or flaked zinc (e.g. electrode 10b of FIG. 2B).

The protective structure 40 may have an inherently high ionic activity. This may lower the cell internal resistance and increase the rate capability of a final electrochemical cell into which the protected negative electrode structure 50, 400 is incorporated. The ionic conductivity of the protective structure 40 may be greater than $10^{-8}$ S/cm. The ionic conductivity of the composite may be at least $10^{-7}$ S/cm. In an embodiment, the ionic activity of the composite may be at least about $10^{-6}$ to $10^{-5}$ S/cm. In another embodiment, the ionic activity of the composite may be as high as $10^{-4}$ to $10^{-3}$ S/cm, or higher.

The thickness of the protective structure 40 may be about 0.1 to 1000 microns.

Where the ionic conductivity is between $1\times10^{-7}$ S/cm and $1\times10^{-6}$ S/cm, the thickness of the protective structure 40 may be between 0.1 and 5 microns, and may be between 0.25 micron and 1 micron.

Where the ionic conductivity is between $1\times10^{-4}$ and $1\times10^{-3}$ S/cm, the thickness of the protective structure 40 may be between 5 and 500 microns. In an embodiment, the thickness is between 10 and 100 microns. In another embodiment, the thickness is between 15 microns and 25 microns.

The protective structure 40 may have a shear modulus higher than that of zinc metal (43 GPa). This may suppress dendrites mechanically.

Generally, the shear modulus of hydrated clay and zeolite minerals range from 5 GPa to 40 GPa. In an embodiment, the solid electrolyte component 411 (e.g. a ceramic used as the solid electrolyte component 411) is selected with a shear modulus between 10 GPa and 50 GPa.

In an embodiment, the filler components 412 (e.g. polymer filler components) are selected with a shear modulus of about 1 GPa to 10 GPa.

The mechanism of dendrite inhibition in the protected zinc electrode 50, 400 of the present disclosure may rely on both mechanically blocking zinc growth and ionically allowing $Zn^{2+}$ diffusion to minimize contact between the active zinc of the zinc electrode 10 and the electrolyte 20, as described above.

Methods of fabricating a protected zinc electrode (e.g. protected zinc electrode 50 of FIG. 2) will now be described.

A method of fabricating a protected zinc electrode 50 may include designing a single-layer or multi-layer protective structure 40. The designing may include selecting components of each layer of the protected zinc electrode 50. The components may be selected from one or more polymers, glasses, or ceramics. Components may be selected to achieve a protected zinc electrode 50 meeting conductivity and mechanical requirements.

The method may include, for each layer in the protective structure 40, mixing of the components.

The components may be mixed using any suitable method. The method may be selected so as to obtain a desired dissolution, dispersion, or suspension of the solid components in a carrier solvent or solvents.

The method of mixing may include, but is not limited to, one or more of mechanical agitation, grinding, ultrasonication, and ball milling.

The method of fabrication may include applying one or more layers of the protective structure 40 onto the negative electrode 10 using any suitable method for application.

In some embodiments, a protective layer formulation or material may be applied on a surface of the negative electrode 10. The protective layer formulation may be applied by, for example, tape casting, slot die coating, reverse roll coating, or spray-painting. The protective layer formulation may be delivered as a slurry, paste, or ink (depending on the viscosity and consistency) to the surface of the negative electrode 10. The negative electrode 10, having the protective layer formulation applied, may then optionally undergo any number of curing, drying, and/or treatment steps prior to the deposition of another layer on top.

In some embodiments, the coating thickness, mechanical integrity, and/or coating uniformity may be tailored by varying the parameters of the coating method used.

Methods of operating a protected zinc electrode (e.g. protected zinc electrode 50 of FIGS. 2A, 2B, 3, and 4) in a rechargeable battery will now be described. The rechargeable battery includes at least one electrochemical cell. The electrochemical cell (e.g. cells 200a, 200b of FIGS. 2A, 2B) includes the protected zinc electrode 50.

The method includes providing a protected zinc negative electrode 50 comprising a zinc negative electrode 10 and a protective structure 40 in physical continuity with the zinc negative electrode 10.

The method further includes providing an electrolyte comprising at least one salt dissolved in at least one solvent, the electrolyte having a pH less than 7.

The method further includes providing a positive electrode. The positive electrode may include a zinc-ion insertion material, a bromide redox active catholyte, an iodide redox active catholyte, an iron redox active catholyte, a cesium redox active catholyte, or air.

The method further includes applying either a current or a potential between the protected zinc negative electrode and the positive electrode to charge the electrochemical cell.

The method further includes draining an electrical load between the protected zinc negative electrode and the positive electrode to discharge the electrochemical cell.

The charging and discharging steps can be performed alternatively.

Other aspects and features of the teachings disclosed herein will become apparent, to those ordinarily skilled in the art, upon review of the following description of the specific examples of the present disclosure.

EXAMPLES

Example 1

Zinc foil was coated by tape casting a LIQUION™ Nafion™ containing Isopropyl Alcohol solution (1 wt % polymer) and air-dried. The resulting protected zinc electrode had a thickness of approximately 45 μm, of which 30 μm correspond to the zinc foil and 15 μm to the protective film.

Example 2

Commercial calcium montmorillonite powder was sieved down to 45 μm and dispersed into a LIQUION™ Nafion™ containing Isopropyl Alcohol solution (1 wt % polymer) via ultrasonication after which the suspension was tape casted onto zinc foil and air dried.

The resulting protected zinc electrode had a thickness of approx. 45 μm, of which 30 μm correspond to the zinc foil and 15 μm to the protective film. The composition of the protective structure was 90 wt % montmorillonite and 10 wt % polymer.

Example 3

Commercial calcium montmorillonite powder was sieved down to 45 μm and dispersed into a LIQUION™ Nafion™ and Butvar® B-98 (polyvinyl butyral) containing Isopropyl Alcohol solution (1 wt % polymer) via ultrasonication after which the resulting suspension was brush painted onto zinc foil and air dried.

The resulting protected zinc electrode had a thickness of approx. 50 μm, of which 30 μm correspond to the zinc foil and 20 μm to the protective film. The composition of the protective structure was 90 wt % montmorillonite, 6 wt % Nafion™ and 4 wt % Butvar® B-98.

Comparative Example 1

A 30 μm-thick zinc foil is used as a negative electrode without any surface protection. In some cell configurations, a titanium plate is used as positive electrode without any surface protection.

Table 1, provided below, shows cell configurations for a given composition of protective structure and the number of cycles achieved before short circuits occurred in Zn||Zn cells cycled at 1 mA cm$^{-2}$ to 1 mAh cm$^{-2}$ deposition and stripping capacities.

Figure 5:
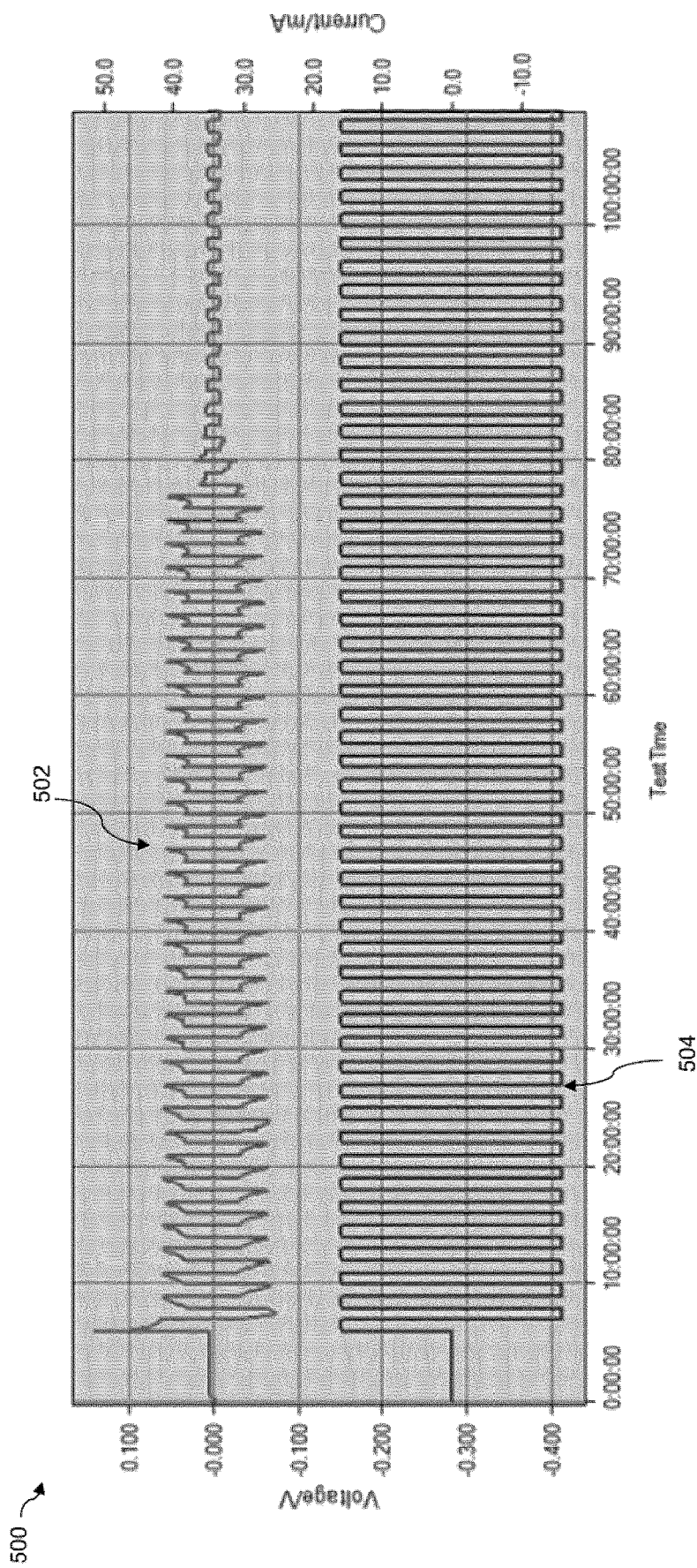
FIG. 5 is an example voltage-time plot for a Zn∥Zn symmetric cell, according to an embodiment.

This Zn||Zn study is also illustrated in FIG. 5, where cells assembled with unprotected electrodes (Comparative Example 1) failed after 31 cycles.

FIG. 5 illustrates an example voltage-time plot 502 for a Zn||Zn symmetric cell, showing a sudden decreased voltage polarization, indicating an internal short-circuit, used to determine the cycle life of these cells. This example cell was cycled at 1 mA cm$^{-2}$ (line 504) to 1 mAh cm$^{-2}$ in 1 M ZnSO$_4$, with both electrodes made of Zinc foil (Comparative Example 1). The number of cycles obtained before the cell failed was 31.

The best results in this study (i.e. longest cycle life) were obtained when a solid electrolyte (e.g. solid electrolyte 411 of FIG. 4) with high ionic conductivity and shear modulus (such as calcium montmorillonite) is used in combination with an ionically conductive filler matrix (e.g. filler matrix 412 of FIG. 4) (such as Nafion™, Table 1, 2a and 2b), and even more so when the filler matrix also includes a polymer with high shear strength (such as Butvar® B-98, Table 1, 3a).

Under this set of testing conditions, the protected Zinc electrode from Example 3 exceeded 800 cycles, which represents a 25-fold increase in cycle life for the symmetrical Zn||Zn cell.

TABLE 1

Comparative examples of cycle life for Zn||Zn cells incorporating protected or unprotected electrodes.

| Example | Negative electrode | Solid-Electrolyte component | Filler component(s) | Positive Electrode | Number of cycles |
|---|---|---|---|---|---|
| 1 | Un-protected zinc foil | | Nafion ™ | Nafion ™ | Protected zinc foil | 42 |
| 2a | Un-protected zinc foil | Calcium Montmorillonite | Nafion ™ | Protected zinc foil | 53 |
| 2b | Protected zinc foil | | | Protected zinc foil | 117 |

TABLE 1-continued

Comparative examples of cycle life for Zn||Zn cells incorporating protected or unprotected electrodes.

| Example | Negative electrode | Solid-Electrolyte component | Filler component(s) | Positive Electrode | Number of cycles |
|---|---|---|---|---|---|
| 3a | Protected zinc foil | Calcium Montmorillonite | Nafion ™, Butvar ® B-98 | Protected zinc foil | >800 |
| Comp. Example 1 | Unprotected zinc foil | none | none | Unprotected zinc foil | 31 |

Table 2, provided below, shows cell configurations for a given composition of protective structure (e.g. protective structure 40 of FIG. 2) and the number of cycles achieved before short circuits occurred in Zn||Ti cells cycled at 1 mA cm$^{-2}$ to 1 mAh cm$^{-2}$ deposition capacity and a 0.7 V stripping cut-off.

Figure 6:
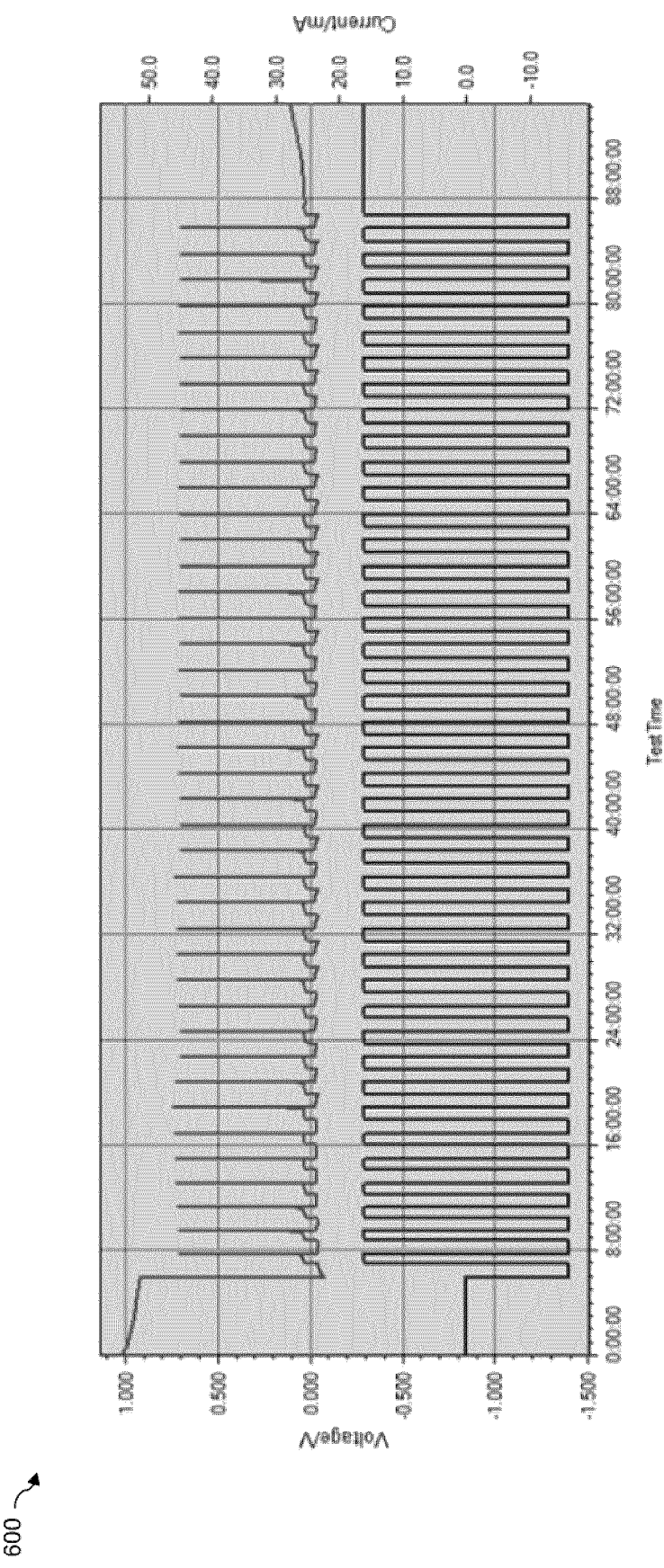
FIG. 6 is an example voltage-time plot showing galvanostatic cycling of a Zn∥Ti cell with an electrolyte including 1 M $ZnSO_4$, according to an embodiment.

This Zn||Ti study is also shown in FIG. 6, where cells assembled with unprotected electrodes (Comparative Example 1) failed after 46 cycles.

FIG. 6 illustrates galvanostatic cycling of a Zn||Ti cell with an electrolyte including 1 M ZnSO$_4$. Electrodes were made of unprotected Zinc and unprotected Titanium plates (Comparative Example 1). Plating of zinc onto the Ti plate was conducted at a current density of 1 mA cm$^{-2}$ with a cut-off capacity limitation of 1 mAh cm$^{-2}$. Stripping of zinc from the Ti plate was conducted at a current density of 1 mA cm$^{-2}$ to an upper voltage cut-off of 0.7 V. The signature of a short-circuit can be observed from the over-charge during the stripping process after 88 hours. The number of cycles obtained before the cell failed was 46. A direct correlation was observed between the number of cycles achieved in Zn||Ti cells and the presence of the protective structure at a surface of the electrodes.

It was found that a protected zinc electrode (e.g. protected zinc electrode 50 of FIG. 2) can extend the cycle life 8-fold (Table 2, 3c).

By comparison, the same protective structure applied to a bare titanium plate only increased the cycle life 3-fold when compared to an unprotected zinc electrode (Table 2, 3b). This can be explained by the preference of zinc to plate onto zinc (as compared to titanium), causing an exacerbated mechanical stress onto the protective structure applied to the titanium, as the electrode is repeatedly fully depleted during stripping.

Nonetheless, the protected electrodes still outperformed unprotected zinc and titanium, and the protective structures proved cumulatively effective to inhibit zinc dendrites formation, as shown by the 9-fold increase in cycle life when both electrodes are protected (Table 2, 3d).

TABLE 2

Comparative examples of cycle life for Zn||Ti cells incorporating protected or unprotected electrodes.

| Example | Negative electrode | Solid-Electrolyte component | Filler component(s) | Positive Electrode | Number of cycles |
|---|---|---|---|---|---|
| 3b | Unprotected zinc foil | Calcium Montmorillonite | Nafion ™, Butvar ® B-98 | Protected titanium plate | 141 |
| 3c | Protected zinc foil | | | Unprotected titanium plate | 366 |
| 3d | Protected zinc foil | | | Protected titanium plate | 403 |
| Comp. Example 1 | Unprotected zinc foil | none | none | Unprotected titanium plate | 46 |

While the above description provides examples of one or more apparatus, methods, or systems, it will be appreciated that other apparatus, methods, or systems may be within the scope of the claims as interpreted by one of skill in the art.

The invention claimed is:

1. An electrochemical cell for use in a rechargeable battery, the electrochemical cell comprising:
   a protected negative electrode;
   a positive electrode;
   an aqueous electrolyte with a pH of less than or equal to 7;
   wherein the protected negative electrode comprises:
      active material comprising zinc metal; and
      a protective structure in physical continuity with the active material, wherein the protective structure comprises one or more layers, and wherein each layer comprises:
         a solid electrolyte component forming a continuous Zn$^{2+}$ ion-conducting network throughout the layer;
      wherein the protective structure forms an impervious barrier to the aqueous electrolyte when arranged in the electrochemical cell and conducts Zn$^{2+}$ ions from the aqueous electrolyte.

2. The electrochemical cell of claim 1, wherein at least one of the one or more layers of the protective structure further comprises a filler component which closes off through-pores in the at least one of the one or more layers.

3. The electrochemical cell of claim 1, wherein the protective structure has a first surface in contact with the active material and a second surface in contact with the aqueous electrolyte.

4. The electrochemical cell of claim 1, wherein the active material comprises a zinc alloy.

5. The electrochemical cell of claim 1, wherein the protected negative electrode further comprises an electrically conductive substrate that is in physical continuity with a layer of the active material.

6. The electrochemical cell of claim 1, wherein the solid electrolyte component in at least one of the one or more layers of the protective structure is a polymer, glass, or ceramic.

7. The electrochemical cell of claim 1, wherein the solid electrolyte in at least one of the one or more layers of the protective structure is a compound that intercalates divalent cations in the at least one of the one or more layers.

8. The electrochemical cell of claim 1, wherein the solid electrolyte component in at least one of the one or more layers of the protective structure is a phyllosilicate, an aluminosilicate, a zeolite, or a clay material.

9. The electrochemical cell of claim 1, wherein the solid electrolyte component in at least one of the one or more layers of the protective structure includes a cation exchange capacity greater than 10 cmolc/kg when the solid electrolyte component is hydrated with $H_2O$ in an interlamellar space.

10. The electrochemical cell of claim 2, wherein the filler component comprises a polymer, a glass, or a ceramic.

11. The electrochemical cell of claim 2, wherein the filler component comprises a polymer, and wherein the polymer is selected from a group consisting of polypropylene, polyethylene, polytetrafluoroethylene, polyvinylidene fluoride, polystyrene, polyvinyl chloride, polyamide, polyimide, polyester, polyacrylonitrile, polyethylene teraphalate, polyethylene oxide, polyvinyl butyral, styrene butadiene rubber, polysaccharide, polypeptide, polyvinyl alcohol, polyacrylic acid, polyurethane, acrylonitrile butadiene styrene, polyvinylpyrrolidone, polyvinyl acetate, polymethyl methacrylate, cis-polyisoprene, polychloroprene, polycarbonate, polyvinyl siloxane, perfluorosulfonic acid, polypyrrole, polyethylene glycol, polyaniline, polythiophene, and polybutyl acrylate.

12. The electrochemical cell of claim 2, wherein the filler component comprises a glass, and wherein the glass comprises any one or more of a silicate, an alumina, a nitride, a carbide, a boride, a titanate, a zirconia, a carbonate, a sulfide, a halide, an oxide, a sulfate, and a phosphate.

13. The electrochemical cell of claim 2, wherein the filler component comprises a ceramic, and wherein the ceramic comprises any one or more of a silicate, an alumina, a nitride, a carbide, a boride, a titanate, a zirconia, a carbonate, a sulfide, a halide, an oxide, a sulfate, and a phosphate.

14. The electrochemical cell of claim 2, wherein the filler component comprises a cation exchange polymer.

15. The electrochemical cell of claim 1, wherein the protective structure has a thickness between 0.1 microns and 1000 microns.

16. A method of fabricating a protected zinc electrode, the method comprising:
providing a zinc electrode including an electrode active material comprising zinc;
providing a protective structure formulation, the protective structure formulation including a solid electrolyte component;
applying a layer of the protective structure formulation onto the zinc electrode;
wherein the protective structure forms an impervious barrier to the aqueous electrolyte when arranged in the electrochemical cell and conducts $Zn^{2+}$ ions from the aqueous electrolyte.

17. The method of claim 16, further comprising:
performing a curing, drying, or treatment step after applying the layer of the protective structure formulation; and
applying a second layer of the protective structure formulation onto the zinc electrode;
wherein the performing step is performed prior to the applying the second layer of the protective structure formulation.

18. The method of claim 16, further comprising mixing a plurality of components to form the protective structure formulation, the plurality of components including the solid electrolyte component and a filler component.

19. The method of claim 16, wherein the applying the layer of the protective structure formulation is performed using tape casting, slot die coating, reverse roll coating, or spray-painting.

20. The method of claim 16, wherein the layer of the protective structure formulation is applied as a slurry, paste, or ink to a surface of the zinc electrode.

* * * * *